(12) United States Patent
Ashley et al.

(10) Patent No.: US 7,734,642 B2
(45) Date of Patent: Jun. 8, 2010

(54) METHOD AND SYSTEM FOR AUTOMATING PURPOSE USAGE SELECTION ON WEB SITES

(75) Inventors: Paul Anthony Ashley, Brisbane (AU); Sridhar R. Muppidi, Austin, TX (US); Mark Vandenwauver, Suffolk, VA (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 11/789,227

(22) Filed: Apr. 24, 2007

(65) Prior Publication Data
US 2008/0270414 A1 Oct. 30, 2008

(51) Int. Cl.
G06F 7/00 (2006.01)
G06F 17/30 (2006.01)
(52) U.S. Cl. ........................................ 707/769; 707/781
(58) Field of Classification Search ................. 707/1–3, 707/9, 10, 200
See application file for complete search history.

(56) References Cited

U.S. PATENT DOCUMENTS

| | | | |
|---|---|---|---|
| 6,477,580 B1 | 11/2002 | Bowman-Amuah | |
| 6,859,784 B1 * | 2/2005 | van Duyne et al. | 705/10 |
| 7,076,558 B1 | 7/2006 | Dunn | |
| 7,480,746 B2 * | 1/2009 | Simon et al. | 710/16 |
| 2003/0110130 A1 * | 6/2003 | Pelletier | 705/50 |
| 2004/0088579 A1 | 5/2004 | Powers et al. | |
| 2005/0076233 A1 * | 4/2005 | Aarts et al. | 713/201 |
| 2005/0193093 A1 | 9/2005 | Mathew | |

(Continued)

OTHER PUBLICATIONS

Bertino et al., "Exception-Based Information Flow Control in Object-Oriented Systems," ACM Transactions on Information and System Security (TISSEC), vol. 1, Issue 1, Nov. 1998.

(Continued)

*Primary Examiner*—Don Wong
*Assistant Examiner*—Merilyn P Nguyen
(74) *Attorney, Agent, or Firm*—Jeffrey S. LaBaw; David H. Judson

(57) ABSTRACT

This invention automates the selection of purpose usages when a user agent interacts with a web site that has been enabled for automated purpose usage information exchange. A user first configures the purpose usage automation in his or her user agent. At this stage, which typically occurs off-line, the user decides on a level of automation when specifying the one or more purpose usages. If desired, this preference may depend on how "trusted" the site is to the user. Later, when the user navigates to an organization's web site, the user agent communicates the purpose usage settings to the organization according to the level of purpose usage automation that has been configured. In particular, when a user's agent visits a web site, the user agent detects that "automated purpose usage" is enabled for the web site. The web site then provides the user agent with a list of one or more purpose usage options required or desired by the organization. The user agent then determines the response for each purpose usage option. This determination may be completely automatic, or partially automated, depending on the user's configuration. The web site then receives the purpose usage selections. At this point, the user agent can provide PII and the user is assured that such information is managed or used by the organization only according to the user's desires.

12 Claims, 4 Drawing Sheets

U.S. PATENT DOCUMENTS

2005/0251491 A1* 11/2005 Medina et al. ............... 705/71
2006/0294024 A1 12/2006 Hatakeyama

OTHER PUBLICATIONS

Graubart, R., "On the Need for Third Form of Access Control," Proceedings of the 12th National Computer Security Conference, Gaithersburg, Maryland, Jun. 1989, pp. 205-303.

Mccollum et al., "Beyond the Pale of MAC and DAC—Defining New Forms of Access Control," Proceedings of the IEEE Symposium on Research in Security and Privacy, Oakland, California, May 1990, pp. 190-200.

Stoughton, A., "Access Flow: A Protection Model Which Integrates Access Control and Information Flow," Proceedings of the IEEE Symposium on Research in Security and Privacy, Oakland, California, Apr. 1981, pp. 9-18.

Damiani et al., "A Fine-Grained Access Control System for XML Documents," Proceeding of the 6th International Conference on Architectural Support for Programming Languages and Operating Systems, San Jose, California, 1994, pp. 297-306.

Bohrer et al., "Individualized Privacy Policy Based Access Control," Proceedings of the 6th International Conference on Electronic Commerce Research (ICECR-6), Dallas, Texas, Oct. 2003, 12 pages.

Miklau et al., "Cryptographically Enforced Conditional Access for XML," Workshop on the Web and Databases (WebDB), Jun. 2002.

Miklau et al., "Controlling Access to Published Data Using Cryptography," Conference on Very Large Databases (VLDB), Sep. 2003.

Damiani et al., "Fine Grained Access Control for SOAP E-Services," Proceedings of the 10th International Conference on the World Wide Web, Hong Kong, Apr. 2001, pp. 504-513.

* cited by examiner

| HELPFUL TIPS | First Name | Felicity |
| --- | --- | --- |
| ▦ Indicates a required field. | Last Name | Flintstone |

First Name: Felicity
Last Name: Flintstone
Address: 106 Chestnut Ave ▦
City: Regina ▦
State: SK ▦
Country: CAN ▦
Zip Code: 56985 ▦
Email address: fflintstone@aol.com ▦

We offer a free online newsletter featuring health care updates and information about our latest services. Would you be interested in receiving it and other promotional information?
◉ Yes  ○ No Credit Card Type: ◉ Visa  ○ Mastercard  ○ American Express  ○ Diners Club  ○ Discover™
Credit Card Number: [        ] ▦
Expiration Date (MM/YY): [        ] ▦
Name on Card: [        ] ▦

Would you like WebMeds to send you an e-mail when your order ships?
○ Yes  ◉ No ( CONTINUE )

*FIG. 1*
*(PRIOR ART)*

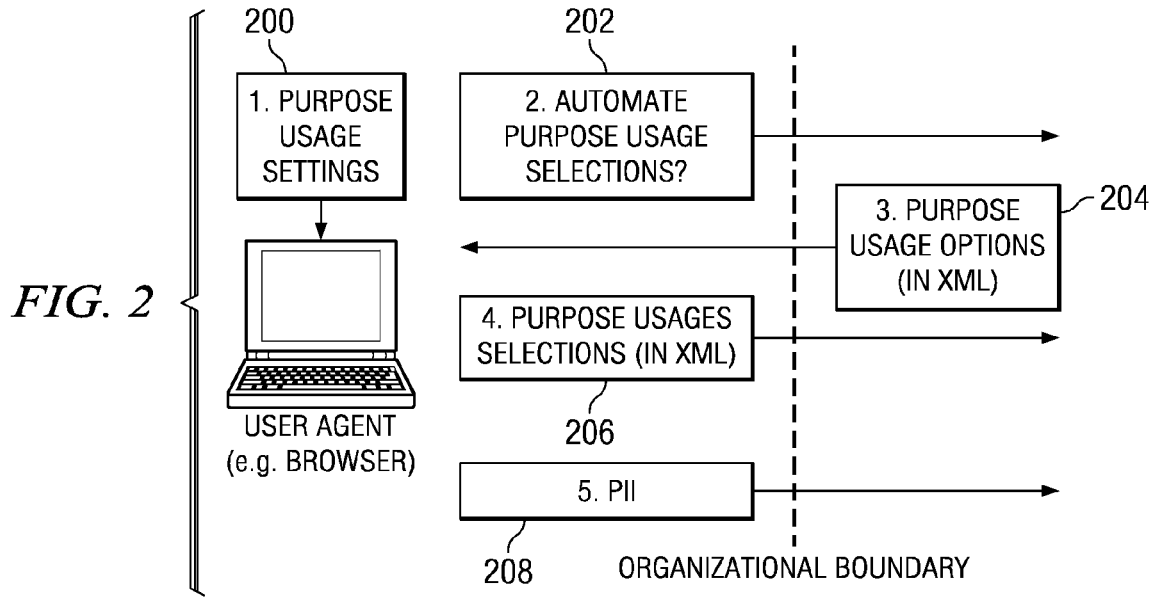
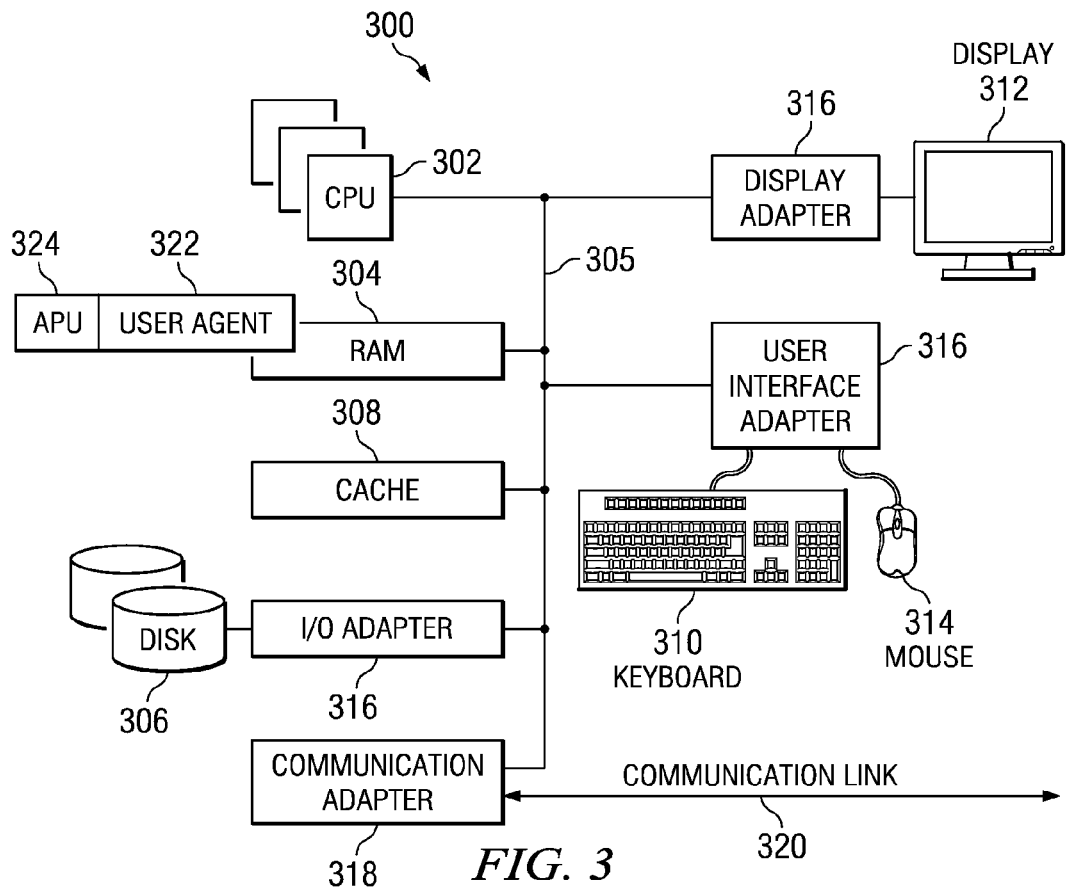

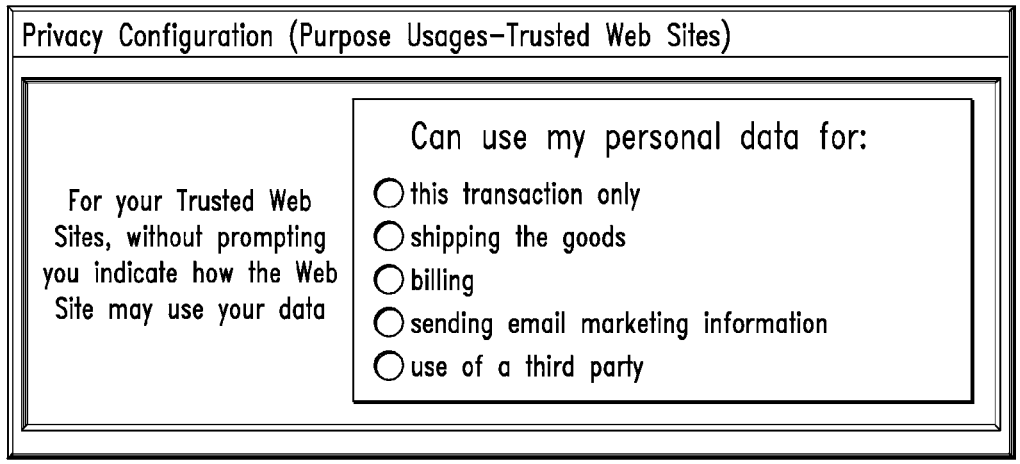

FIG. 4

```
Opt-in

<xacml:Condition xmlns:xacml="urn:oasis:names:tc:xacml:1.0:policy"
FunctionId="urn:oasis:names:tc:xacml:1.0:function:any-of">
  <xacml:Function FunctionId="urn:oasis:names:tc:xacml:1.0:function:string-equal"/>
  <xacml:EnvironmentAttributeDesignator
AttributeId="urn:ibm:epal:attribute:CustomerRecord:OptInToThirdPartyMarketing"
DataType="http://www.w3.org/2001/XMLSchema#string"/>
  <xacml:EnvironmentAttributeDesignator
AttributeId="urn:ibm:epal:attribute:Synonyms:True"
DataType="http://www.w3.org/2001/XMLSchema#string"/>
</xacml:Condition>

Opt-out

<xacml:Condition xlmns:xacml="urn:oasis:names:tc:xacml:1.0:policy"
FunctionId="urn:oasis:names:tc:xacml:1.0:function:not".
  <xacml:Apply FunctionId="urn:oasis:names:tc:xacml:1.0:function:any-of">
    <xacml:Function FunctionId="urn:oasis:names:tc:xacml:1.0:function:string-equal"/>
    <xacml:EnvironmentAttributeDesignator
AttributeId="urn:ibm:epal:attribute:CustomerRecord:OptInToThirdPartyMarketing"
DataType="http://www.w3.org/2001/XMLSchema#string"/>
    <xacml:EnvironmentAttributeDesignator
AttributeId="urn:ibm:epal:attribute:Synonyms:True"
DataType="http://www.w3.org/2001/XMLSchema#string"/>
  </xacml:Apply>
</xacml:Condition>
```

FIG. 6

METHOD AND SYSTEM FOR AUTOMATING PURPOSE USAGE SELECTION ON WEB SITES

RELATED APPLICATION

This application is related to commonly-owned U.S. Ser. No. 11/739,207, filed Apr. 24, 2007, titled "Method and system for protecting personally identifiable information."

BACKGROUND OF THE INVENTION

1. Technical Field

The present invention relates generally to automating information exchange within an online web-based environment.

2. Background of the Related Art

In the content of information security and privacy, so-called "personally identifiable information" or "personally identifying information" (PII) is any piece of information that can be used to uniquely identify, contact or locate a given person. In today's online world, an end user frequently visits numerous web sites on a daily basis to obtain information, transact electronic commerce, and perform other work- or entertainment-related functions. Virtually every visit to every web site presents an opportunity for an organization to obtain an end user's PII.

Before an online user provides personally identifiable information to an organization, the user should be fully aware of the organization's privacy policy, and he or she should be given a choice of different "purpose usages" for such information. In particular, the user should be given an opportunity (e.g., via web-based HTML fill-in forms or the like) to indicate to the organization which of the purpose usages for the PII he or she is willing to permit. For example, the user may decide that the organization can use his or her PII for one or more different scenarios, e.g.: for a given transaction only, for shipping goods to the user, for billing the user, for sending e-mail marketing information, for providing the PII to a third party. Each of the examples is a "purpose usage" for the PII, and they are merely exemplary. In the past, it has been known in the art to provide a user visiting a web site with a web-based form from which the user can select one or more purpose usages. In particular, when the user provides PII to an organization, the user may be queried with a list of purpose usages, or with a specific purpose usage. An example of this known approach is shown in FIG. 1, which is a screen shot of a web browser that includes an HTML form with several such requests. In the illustrated example, the end user is submitting given PII (residence address, email address, credit card data, or the like) and is being asked whether such PII can be re-used from some other purpose. The purpose usages are shown circled in the figure. The end user then is forced to manually input a response, often on a purpose usage-by-purpose usage basis. For most web users, the process is slow and tiresome and, thus, it inhibits efficient online business and information exchange.

It is also known in the art to automate the process of notifying an end user about a privacy policy enforced on the web site to which the end user has navigated. The Platform for Privacy Preferences (P3P) is a Web standard that provides this functionality. In particular, an enabled user agent (e.g., a web browser that conforms to the P3P standard) reads P3P files (typically in the form of Extensible Markup Language, or XML) from the web site automatically and then indicates to the user if the site's P3P policy matches the user agent privacy settings. In effect, a P3P-enabled web browser acts as an alerting mechanism to inform the end user if the end user's privacy settings can be accommodated on the web site. In this way, P3P automates the process of comparing the user's own privacy preferences with the privacy policy of a web site.

Although P3P does reduce the time necessary for the user to understand an organization's privacy policy, it does not address purpose usage or provide any mechanism for enabling an end user to indicate to the organization his or her purpose usage selections. Accordingly, even if a site is P3P-compliant, the selection of purpose usages still is a manual process.

BRIEF SUMMARY OF THE INVENTION

The present invention automates the way purpose usage is communicated from a user agent (namely, a web browser or other similar client-side engine) to an organization in an online web-based environment. It may be used in conjunction with P3P, or as a standalone solution. In particular, the invention minimizes the amount of manual intervention required from a user when specifying purpose usages to an organization.

In one embodiment, a method is implemented at a web site that has been enabled for automated purpose usage selection. In particular, in response to query from a user agent that has been pre-configured with a set of one or more purpose usage selections, the user agent is provided a purpose usage option. The user agent then receives at least one purpose usage setting from the set of one or more purpose usage selections that have been pre-configured. According to the method, personally identifying information (PII) is then received, and this information is then managed in accordance with the at least one purpose usage setting receiving from the user agent.

Thus, according to an embodiment, a user first configures the purpose usage automation in his or her user agent. At this stage, which typically occurs off-line, the user decides on a level of automation when specifying the one or more purpose usages. If desired, this preference may depend on how "trusted" the site is to the user. Later, when the user navigates to an organization's web site, the user agent communicates the purpose usage settings to the organization according to the level of purpose usage automation that has been configured. In particular, when a user's agent visits a web site supporting purpose usage automation, the user agent detects that "automated purpose usage" is enabled for the web site. The web site then provides the user agent with a list of one or more purpose usage options required or desired by the organization. The list may be provided on a page-by-page basis, or for each different PII entry form. The user agent then determines the response for each purpose usage option. This determination may be completely automatic, or partially automated, depending on the user's configuration. The web site then receives the purpose usage selections. At this point, the user agent can provide PII and the user assured that such information is managed by the organization according to the user's desires.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 1 depicts a prior art manual approach to purpose usage selection;

FIG. 2 is a process flow illustrating an embodiment of the present invention;

FIG. 3 is a representative data processing system for use in carrying out the present invention;

FIG. 4 is a representative display panel from which a user can select one or more purpose usages;

FIG. 6 illustrates sample XACML showing illustrating a purpose usage selection.

Figure 5:
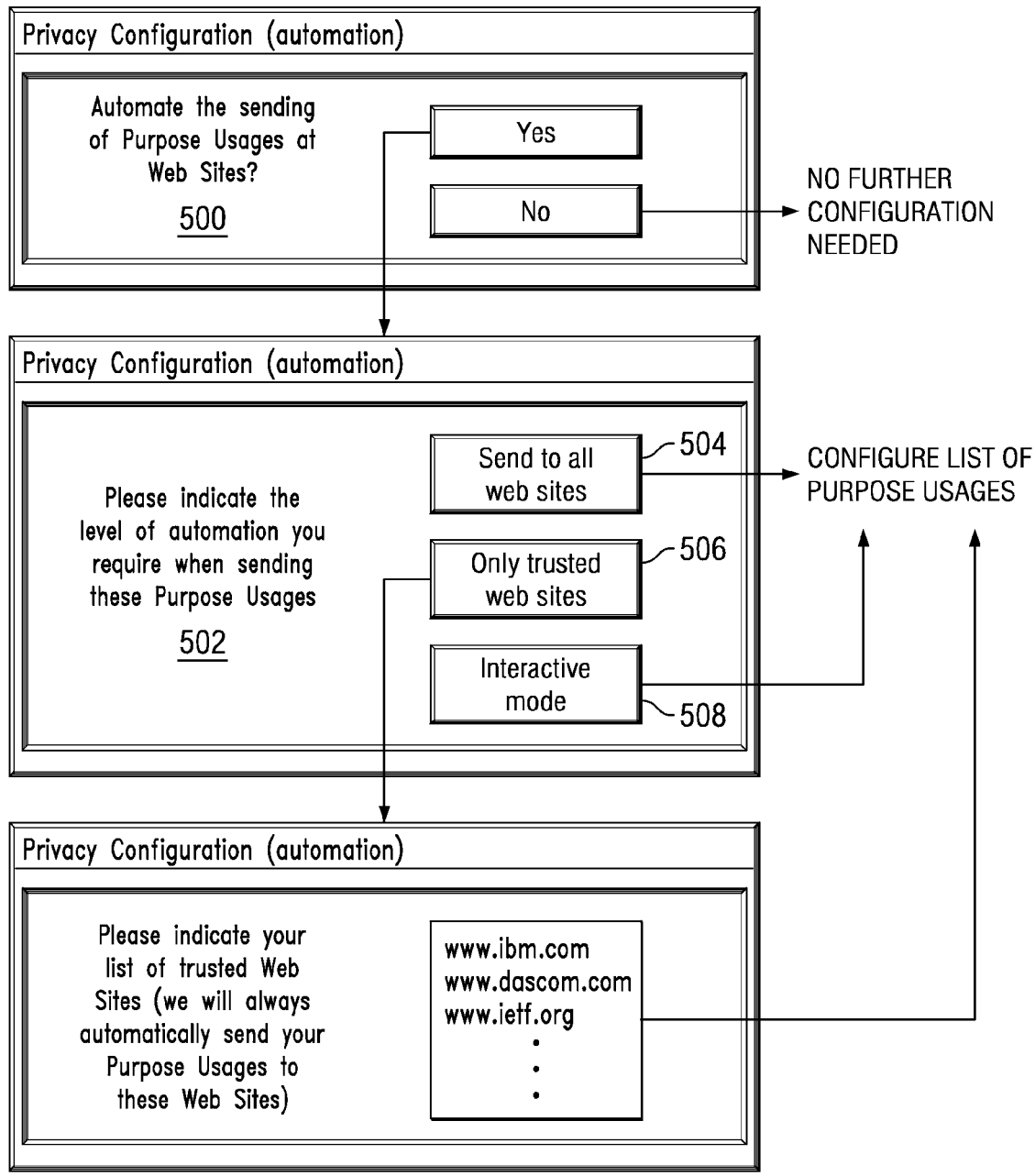
FIG. 5 illustrates several ways in which a client should implement automated purpose usage selections.

DETAILED DESCRIPTION OF AN
ILLUSTRATIVE EMBODIMENT

The present invention operates in conjunction within the standard client-server paradigm in which client machines communicate with an Internet-accessible server (or set of servers) over an IP-based network, such as the publicly-routable Internet. The server supports a web site in the form of a set of one or more linked web pages. End users operate Internet-connectable devices (e.g., desktop computers, notebook computers, Internet-enabled mobile devices, cell phones having rendering engines, or the like) that are capable of accessing and interacting with the site. Each client or server machine is a data processing system comprising hardware and software, and these entities communicate with one another over a network, such as the Internet, an intranet, an extranet, a private network, or any other communications medium or link. As described below, a data processing system typically include one or more processors, an operating system, one or more applications, and one or more utilities. The applications on the data processing system provide native support for Web services including, without limitation, support for HTTP, SOAP, XML, WSDL, UDDI, and WSFL, among others. Familiarity with these technologies and standards is presumed. Further information regarding SOAP, WSDL, UDDI and WSFL is available from the World Wide Web Consortium (W3C), which is responsible for developing and maintaining these standards; further information regarding HTTP and XML is available from Internet Engineering Task Force (IETF).

FIG. 2 shows the main steps in the automation of privacy purpose usage selections according to an embodiment of the present invention. First, at step 200, the end user configures his or her user agent (typically, a web browser) with desired purpose usage settings. In the usual case, this configuration step, which is described in more detail below, takes place off-line, i.e., without the user agent opened to a given web site (or page). FIG. 4 illustrates a simple display menu that can be used for this purpose. As can be seen, the display menu exposes a set of purpose usages that can be selected using radio buttons or the like. At step 202, the user navigates to a web site that has been enabled for automated purpose usage. At step 204, the web site automatically provides the user agent a list of one or more purpose usage option(s) that need to be responded to by the user. Typically, the option(s) are provided by an XML information exchange, although this is not a requirement. At step 206, the user—via the user agent—provides the response(s) to the purpose usage option(s). Step 206 typically is automated, partially automated, or interactive, in accordance with how the end user has configured his or her user agent. With the purpose usages selected in this automated manner, the user can then safely provide his or her personally identifying information (PII).

Each of these steps will be further described in detail below.

The first step (step 200 in FIG. 2) configures the purpose usage settings in the user agent. In particular, preferably the user agent is first configured to determine how it should implement automated purpose usage selections. FIG. 5 illustrates several possible embodiments for this functionality. In one embodiment, indicated by reference numeral 500, the user agent is configured either to support automated purpose usages, or to not support this function. In another embodiment, indicated by reference numeral 502, a set of selections preferably are managed according to one of several alternative modes: a fully automatic mode 504 (in which case the user agent answers to each purpose usage query from all web sites), a semi-automatic mode 506 (in which case the user agent answers to each purpose usage query from only "trusted" web sites, as defined below), or an interactive mode 508 (in which case the user agent only provides answers to each purpose usage query after prompting the user and getting a permission). If the semi-automatic mode is in effect and the given web site to which the end user has navigated is not on a list of trusted sites, preferably the user agent falls back to the interactive mode. In yet another embodiment, a set of selections are managed according to one of several setting types: standard settings (in which case the user agent makes selections using a standard list of purpose usages, which selections are then used for all web sites), semi-standard settings (in which case the user agent makes selections using a standard list of purpose usages that are used only for "trusted" web sites), and individual settings (in which case the user agent prompts the user for purpose usages for the particular web site being visited). As before, if the semi-standard settings type is in effect and the given web site to which the end user has navigated is not on a list of trusted sites, preferably the user agent falls back to the individual settings mode. The standard list of purpose usages may include an industry specific standard list, a custom standard list created by an individual web site, a list provided by a standards organization, or the like.

The various configurations described above are merely exemplary. One or more of these configurations may be combined.

The second step (step 202 in FIG. 2) detects if the web site is enabled for automated purpose usage. This step typically occurs when an end user opens his or her user agent to a web site. Although not required, a web site may advertise to the end user (e.g., by way of a given icon on the site) that it is enabled for automated purpose usage selection according to the present invention. Preferably, however, step 202 takes place via an automated information exchange between the user agent and the site itself. To this end, an XML or other file (indicating that the site supports automated purpose usage settings) is defined and stored in a standard place on the web site. This is similar to P3P where a given directory is identified to hold the P3P files. For example, the purpose usage setting file is stored in a known directory, such as /auto-purpose/. The user agent determines if the web site supports automated purpose usage via a simple message exchange. In particular, this determination can be enabled by an XML-based information exchange between the user agent and the site, with the user agent going to the directory to perform a simple check on the support of automated purpose usage. The XML file preferably contains a set of one or more configuration options, namely, the list of required or desired purpose usage settings. The XML file may conform to XACML, the Extensible Access Control Markup Language standard, as in the sample shown in FIG. 6.

In the third step (step 204 of FIG. 2), the web site provides the user agent a list of one or more purpose usage options. Once again, this is a simple XML-based information exchange. If desired, there may be a separate purpose usage option list (in the form of an XML code snippet) for each different PII entry form on the web site. In the latter case, the PII entry form may contain a cookie or hidden field to inform the user agent of the place to find the purpose usage option list file.

In the fourth step (step 206 of FIG. 2), the user agent provides the purpose usage selections. Depending on the configuration settings as described above (in step 200), the user agent provides the list of purpose usage selections either completely without further user input, or this step may require varying levels of user input. As has been described, the amount of manual intervention depends on the user's configuration settings and, in some cases, if the web site is considered by the user agent to be trusted. The purpose usage selections are provided to the web site using various any convenient method. At a minimum, a simple HTTP POST protocol may be used to send the selections to the web site. In the alternative, more sophisticated client-side techniques may be used to facilitate this information exchange. Thus, for example, although not required, the user agent may implement AJAX (Asynchronous Javascript and XML), which are a known set of web development techniques that enhance web page interactivity, speed and usability. AJAX technologies include XHTML (Extensible HTML) and CSS (Cascading Style Sheets) for marking up and styling information, the use of DOM (Document Object Model) accessed with client-side scripting languages, the use of an XMLHttpRequest object (an API used by a scripting language) to transfer XML and other text data asynchronously to and from a server using HTTP), and use of XML or JSON (Javascript Object Notation, a lightweight data interchange format) as a format to transfer data between the server and the client. Any of these technologies may be used for sending the purpose usage selections to the web site that has been enabled for automated purpose usage selection exchange.

At the fifth step (step 208 of FIG. 2), the organization receives the PII. In particular, once the user agent has provided the purpose usage selections to the web site, then the organization can receive the PII. Preferably, the PII data is provided to the web site in a privacy-protected manner, such as via XML encryption and XML digital signature technologies. In this manner, the user has shown explicit consent to the purpose usages, and the organization can use this as evidence of the user's wishes.

FIG. 3 illustrates a representative data processing system 300 for use as the client machine. A data processing system 300 suitable for storing and/or executing program code will include at least one processor 302 coupled directly or indirectly to memory elements through a system bus 305. The memory elements can include local memory 304 employed during actual execution of the program code, bulk storage 306, and cache memories 308 that provide temporary storage of at least some program code to reduce the number of times code must be retrieved from bulk storage during execution. Input/output or I/O devices (including but not limited to keyboards 310, displays 312, pointing devices 314, etc.) can be coupled to the system either directly or through intervening I/O controllers 316. Network adapters 318 may also be coupled to the system to enable the data processing system to become coupled to other data processing systems or devices through intervening private or public networks 320. The data processing system 300 also includes the user agent 322. The automated purpose usage support is provided by code 324, which may be native to the user agent, an applet or other plug-in, a script, an AJAX snippet, or the like. This code also may be served to an end user's client machine when the end user accesses an enabled web site, although in the usual case it is persistent on the client machine.

An end user accesses an enabled web site in the usual manner, i.e., by opening the user agent to a URL associated with a service provider domain. The user may authenticate to the site (or some portion thereof) by entry of a username and password. The connection between the end user entity machine and the system may be private (e.g., via SSL). Although connectivity via the publicly-routed Internet is typical, the end user may connect to the system in any manner over any local area, wide area, wireless, wired, private or other dedicated network. A representative web server is Apache (2.0 or higher) that executes on a commodity machine (e.g., an Intel-based processor running Linux 2.4.x or higher). A data processing system such as shown in FIG. 3 also can be used as to support the server architecture.

Preferably, an end user's automation preferences (for a particular site, or for a set of sites) may be stored in an accessible location, possibly at a third party site or location. One advantage of this is that the end user could access that configuration data whenever it is needed and, thus, he or she would not have to re-enter a automation preferences each time he or she used a new or different browser. If desired, an Internet-based managed service may be used for the storage, accessing and updating of a particular user's automation preferences.

More generally, the invention can take the form of an entirely hardware embodiment, an entirely software embodiment or an embodiment containing both hardware and software elements. In a preferred embodiment, the invention (comprising the client side functionality, the server side functionality, or both) is implemented in software, which includes but is not limited to firmware, resident software, microcode, and the like. Furthermore, as noted above, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

One or more of the above-described functions may also be implemented as a service in a hosted manner. Thus, for example, a user's automated purpose usage configuration and selections may be hosted on an information service and provided on demand to the automated purpose usage-enabled web site. In addition, the present invention may be implemented within the context of a federated environment, such as described in U.S. Publication No. 2006/0021018, filed Jul. 21, 2004. As described in that document, a federation is a set of distinct entities, such as enterprises, organizations, institutions, etc., that cooperate to provide a single-sign-on, ease-of-use experience to a user. Within a federated environment, entities provide services that deal with authenticating users, accepting authentication assertions (e.g., authentication tokens) that are presented by other entities, and providing translation of the identity of a vouched-for user into one that is understood within a local entity. The automated purpose usage configuration and selections as described herein may be an additional service provided by a given entity in a federated environment.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. A method, implemented at a web site that has been enabled for automated purpose usage selection, comprising:
    responsive to a query from a user agent that has been pre-configured with a set of one or more purpose usage selections, providing to the user agent a purpose usage option;
    receiving from the user agent at least one purpose usage setting from the set of one or more purpose usage selections that have been pre-configured;
    receiving personally identifying information (PII); and
    managing the personally identifying information received from the user agent in accordance with the at least one purpose usage setting received from the user agent;
    wherein the step of providing to the user agent the purpose usage option and the step of receiving from the user agent at least one purpose usage setting occur in an automated manner without user input.

2. The method as described in claim 1 wherein the purpose usage option is one of a set of purpose usage options.

3. The method as described in claim 2 further including receiving from the user agent a purpose usage setting for each purpose usage option.

4. The method as described in claim 1 wherein the purpose usage option is associated with a given storage location.

5. The method as described in claim 1 wherein the web site is associated with a set of one or more trusted web sites that have been identified to the user agent.

6. The method as described in claim 1 wherein the user agent is a web browser.

7. The method as described in claim 1 further including providing the user agent an indication that the web site is enabled for automated purpose usage selection.

8. The method as described in claim 7 wherein the indication is provided via an automated information exchange initiated from the web site.

9. The method as described in claim 1 wherein the purpose usage option is provided via an XML-based information exchange initiated from the web site.

10. The method as described in claim 9 wherein the XML-based information exchange includes transferring from the web site to the user agent an XML code snippet for each personally identifiable information entry form on the web site.

11. Apparatus operative at a web site for automated purpose usage selection, comprising:
    a processor, and
    a computer memory holding computer program instructions which, when executed by the processor, perform a method comprising:
        responsive to a query from a user agent that has been pre-configured with a set of one or more purpose usage selections, providing to the user agent a purpose usage option;
        receiving from the user agent at least one purpose usage setting from the set of one or more purpose usage selections that have been pre-configured;
        receiving personally identifying information (PII); and
        managing the personally identifying information received from the user agent in accordance with the at least one purpose usage setting received from the user agent;
        wherein the step of providing to the user agent the purpose usage option and the step of receiving from the user agent at least one purpose usage setting occur in an automated manner without user input.

12. A computer program product comprising a computer useable medium having a computer readable program, wherein the computer readable program when executed on a server causes the server to perform the following method steps:
    displaying, as a web site, a set of pages at least one of which has been enabled for automated purpose usage selection, comprising:
    responsive to a query from a user agent that has been pre-configured with a set of one or more purpose usage selections, providing to the user agent a purpose usage option;
    receiving from the user agent at least one purpose usage setting from the set of one or more purpose usage selections that have been pre-configured;
    receiving personally identifying information (PII); and
    managing the personally identifying information received from the user agent in accordance with the at least one purpose usage setting received from the user agent;
    wherein the step of providing to the user agent the purpose usage option and the step of receiving from the user agent at least one purpose usage setting occur in an automated manner without user input.

* * * * *